March 28, 1939. P. KUCERA Re. 21,037

DISPLACEMENT GLASS FEEDER

Original Filed March 1, 1932 6 Sheets-Sheet 1

INVENTOR
Peter Kucera
by William B. Jaspert
attorney.

March 28, 1939. P. KUCERA Re. 21,037

DISPLACEMENT GLASS FEEDER

Original Filed March 1, 1932 6 Sheets-Sheet 2

INVENTOR
Peter Kucera
by William B. Jaspert
Attorney.

DISPLACEMENT GLASS FEEDER

Original Filed March 1, 1932 6 Sheets-Sheet 3

INVENTOR
Peter Kucera
by William B. Jasper
Attorney.

DISPLACEMENT GLASS FEEDER

Original Filed March 1, 1932 6 Sheets-Sheet 4

INVENTOR
Peter Kucera
by William B. Jaspert
Attorney.

DISPLACEMENT GLASS FEEDER

Original Filed March 1, 1932 6 Sheets-Sheet 5

INVENTOR
Peter Kucera
by William B. Jaspert
Attorney

March 28, 1939. P. KUCERA Re. 21,037

DISPLACEMENT GLASS FEEDER

Original Filed March 1, 1932 6 Sheets-Sheet 6

INVENTOR
Peter Kucera
by William B. Jaspert
Attorney.

Reissued Mar. 28, 1939

Re. 21,037

UNITED STATES PATENT OFFICE 21,037

DISPLACEMENT GLASS FEEDER

Peter Kucera, Allison Park, Pa., assignor to Hartford-Empire Company, Hartford, Conn., a corporation of Delaware Original No. 1,997,799, dated April 16, 1935, Serial No. 595,984, March 1, 1932. Application for reissue November 18, 1936, Serial No. 111,401

19 Claims. (Cl. 49—55)

This invention relates to methods of and apparatus for segregating glass for mold charges of predetermined weight and shape from a glass mass of suitable physical and thermal characteristics, and it is among the objects thereof to provide apparatus for the purpose stated which shall embody adjusting means for the operating mechanism and which shall further be adapted for the regulation of such adjusting means during the operation of the glass feeding apparatus.

A further object of the invention is the provision of apparatus of the above designated character which shall maintain the segregated mold charges or gobs of uniform shape and weight for a maximum period of time consistent with the control of the quality and thermal properties of the glass delivered by the melting tank, and which shall provide for the rapid adjustment of the apparatus to compensate for any changes that are deemed expedient or necessary to make.

Another object of the invention is the provision of glass feeding apparatus in which a hollow bell shaped member is submerged or partially submerged in the glass mass in register with the outlet orifice to impart impulses to the surface of the glass and which shall be provided with associated mechanisms for regulating or varying such impulses in accordance with the shape and weight of the mold charges which it is desired to produce.

Another object of the invention is the provision of means for producing an air bubble in the feeding bell for regulating the weight of the gobs discharged from the outlet orifice.

Another object of the invention is the provision of pressure regulating and adjusting means for the feeding bell by means of which a balance of pressure may be produced in said bell and which shell be adapted to maintain such balanced pressure once the proper adjustment has been obtained.

A still further object of the invention is the provision of means for adjusting the bell relative to a well provided above the outlet orifice or feeder ring whereby the glass flow to the bell and from the latter to the outlet orifice is partially controlled.

Briefly, the invention consists of a glass feeding trough communicating with a glass melting furnace and having a feeder boot provided at its extended end, the boot being constructed in the shape of a well having a feeder ring or discharge orifice and having a bell in vertical alignment therewith, the bell being vertically adjustable relative to the well to vary the glass flow. Mechanism is provided to be adjustable during the operation of the feeder for imparting impulses to the feeder bell, the impulses being produced through a fluid pressure mechanism employing a plunger, the length of stroke, and the rate at which successive strokes are imparted thereto, being regulated by adjusting mechanism which embodies a differential device. A glass cutting mechanism or shear is provided below the feeder ring and is operated to sever the glass in predetermined relation to the feeding of the glass through the impulses imparted to the glass mass within the feeder boot, the shearing mechanism being adjustable through the controls rendered operative by the actuating mechanism of the impulse producing device.

Both the feeding mechanism and the shear operating mechanism are adjustable independently to provide changing the rate of feed and the shearing action to vary the length or weight of the mold charges produced thereby, and this mechanism will now be described in detail with reference to the accompanying drawings constituting a part hereof in which like reference characters designate like parts and in which.

Figure 1:
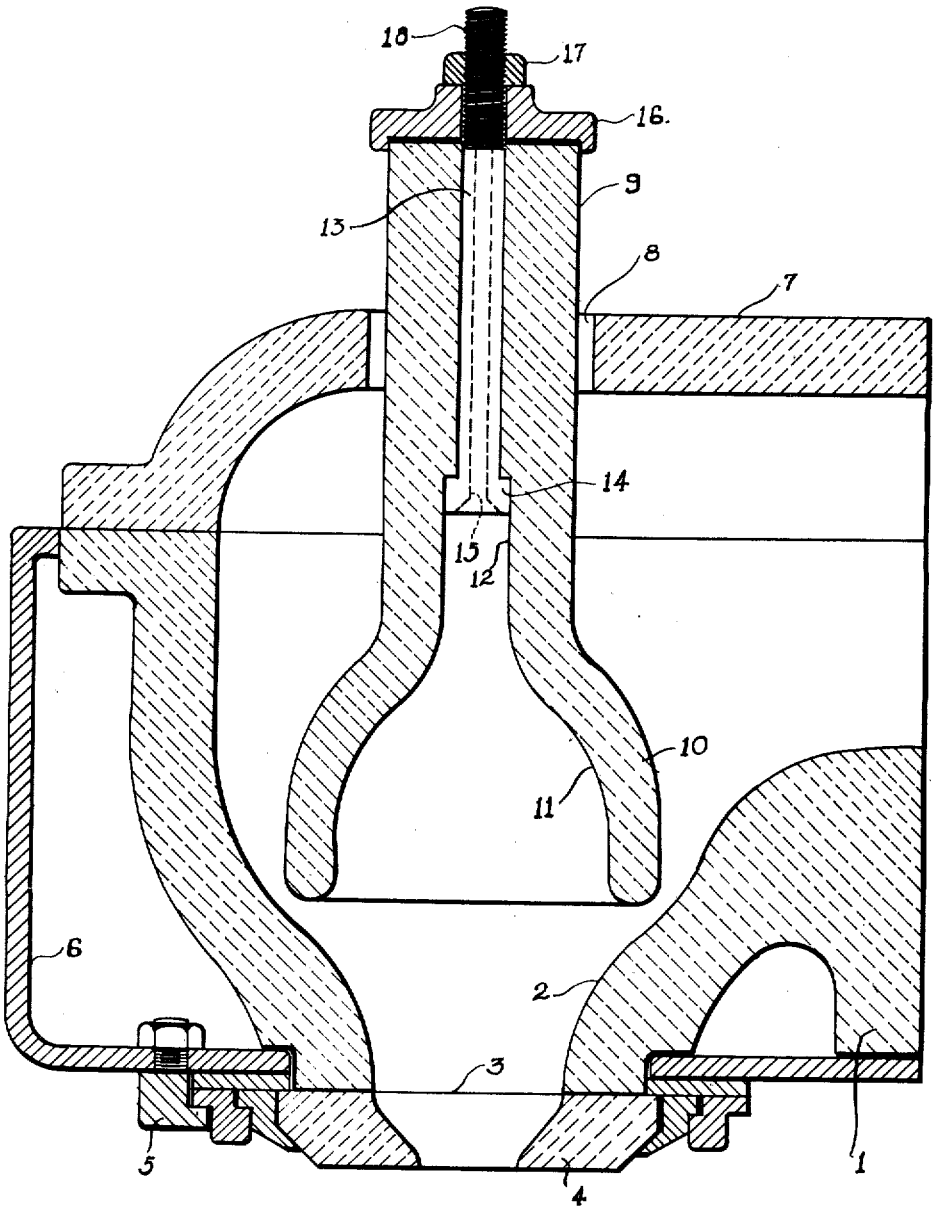
Figure 1 is a vertical cross-sectional view of a well shaped feeder boot and a bell shaped impulse member embodying the principles of this invention.

With reference to Figure 1 of the drawings, the structure therein illustrated comprises a boot generally designated by the reference character 1, the end of which terminates in a well 2 having an opening 3 below which an orifice ring 4 is secured by clamping means generally designated at 5 attached to a metallic casing 6 that surrounds the boot to protect the refractory material and to provide an air space to reduce the loss of heat by radiation and maintain the glass within the well at proper working temperature. A cover 7 is provided to form a closure in which the glass is retained and the cover is provided with an opening 8 through which is disposed the shank 9 of a bell 10 constructed of refractory material, the bell shaped portion of which is adapted to be submerged in the glass mass in the well 2.

The bell member 10 is hollow having a relatively large cavity 11 which terminates in a more constricted cavity 12 in which is disposed a metallic rod 13 having a shoulder 14 at the lower end thereof for supporting the bell 10, the rod being provided with an orifice 15 which communicates with a conduit as hereinafter explained. The refractory bell or the shank 9 thereof is also supported by a bracket 16 which is fastened to the rod 13 by means of a nut 17 on the threaded end 18 of the supporting rod 13.

Figures 3, 10:
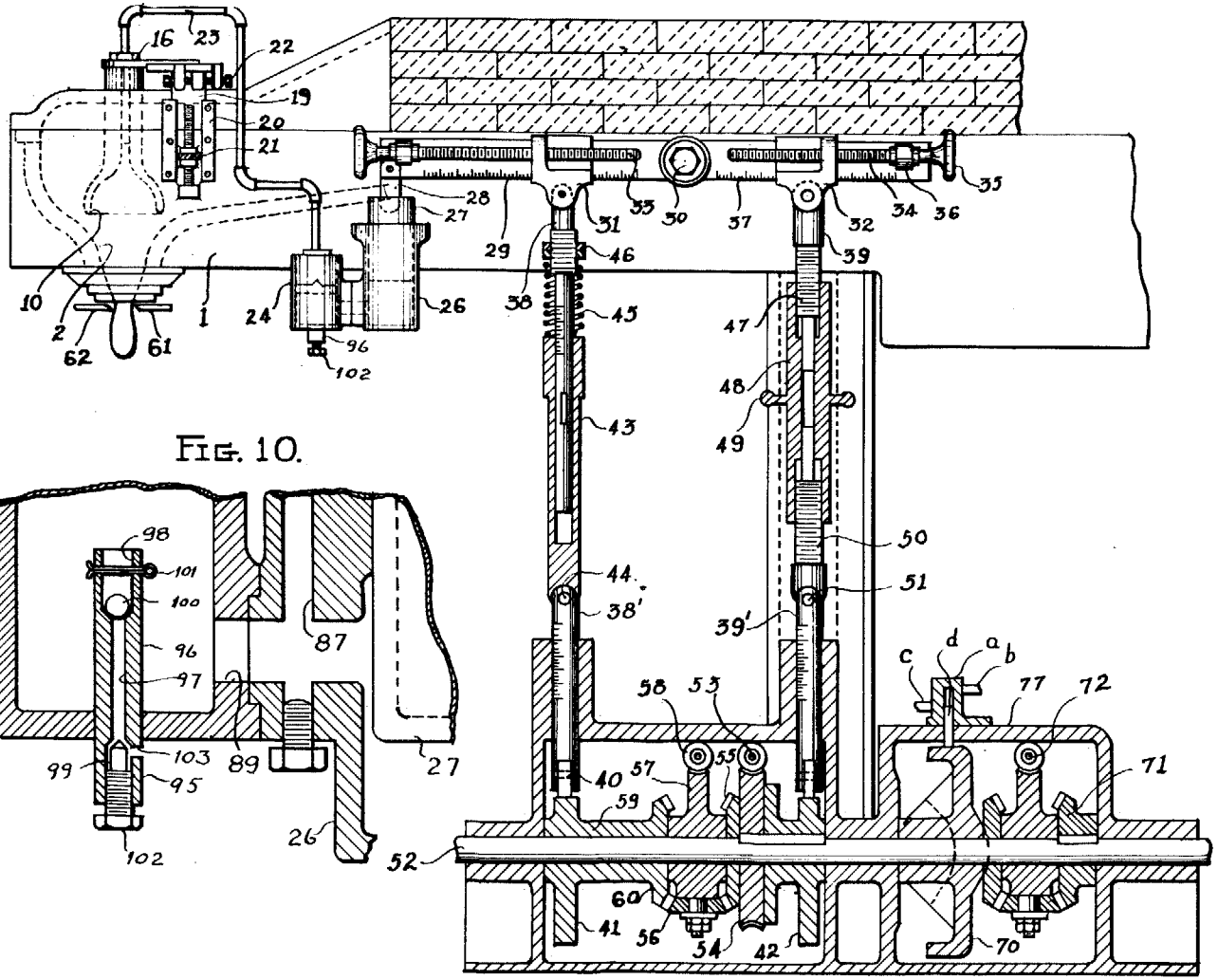
Figure 3 is a side elevational view of the feeder boot, the impulse mechanism, and the operating and control mechanism, the latter being shown in section.
Figure 4:
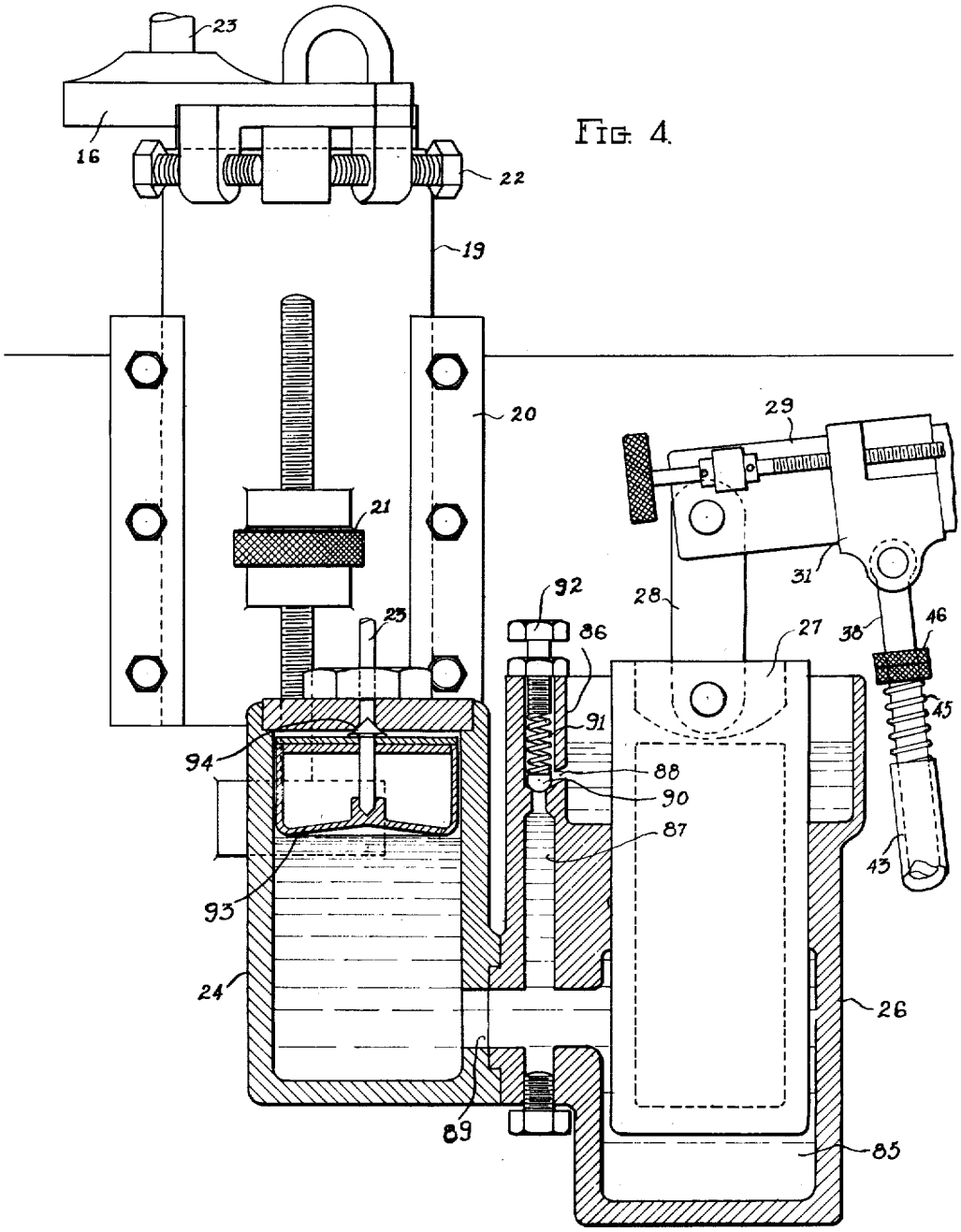
Figure 4 is an enlarged detail view of the fluid pressure device employed for creating impulses in the feeding bell.

In Figures 3 and 4 the bell supporting bracket 16 is shown mounted on a slide bracket 19 which operates in guideway 20 by manipulation of an adjusting screw nut 21 by means of which the mouth of the bell 10 is adjusted vertically with respect to the well 2. Bracket 16 is provided with adjusting screws 22 by means of which it is angularly adjustable to align the bell 10 with the outlet orifice 3 of the boot.

Figure 6:
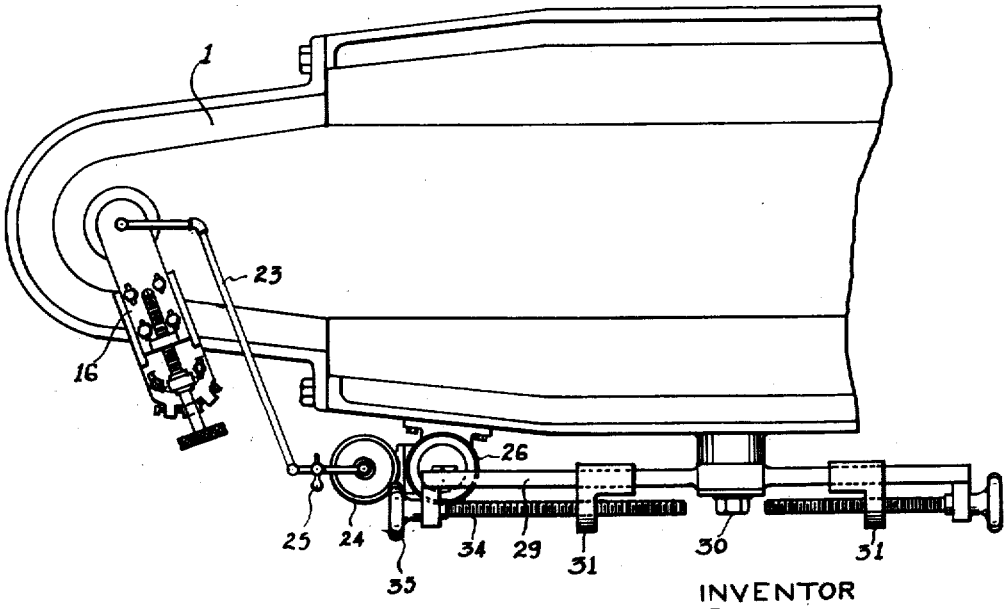
Figure 6 is a top plan view of the feeder boot and flow channel.

The top of the bell is connected by a conduit 23 to a cylinder 24, Fig. 4, and a valve 25 is interposed in the line, Figure 6, to control an opening to the atmosphere when the pulsating mechanism is operative at the beginning of the feeding operation and it is desired to disconnect the feeding bell. The cylinder 24 is connected to or integrally joined with a piston cylinder 26 in which a plunger 27 is operatively disposed, the plunger being connected by a link 28 to an oscillating bar generally designated at 29, the bar being pivoted at 30 to subject it to oscillating movement.

On the bar 29 are a pair of slide brackets 31 and 32 which are actuated by screws 33 and 34 respectively, the screws being provided with hand wheels 35 to rotate them and are disposed in journals 36 whereby upon rotation of the wheels 35 the brackets 31 and 32 slide on the arm 29 to positions determined by the calibration or markings 37.

Slide brackets 31 and 32 are pivotally connected to links 38 and 39 respectively which through jointed connections are connected to slide rods 38' and 39' which are provided with cam followers 40 that engage the outer faces of cams 41 and 42.

The connecting rod 38 is disposed within a hollow coupling sleeve 43 that is pivoted to the slide rod 38' at 44. A coil spring 45 is interposed between the top of sleeve 43 and adjustable screw nuts 46 on the threaded portion of the rod 38 whereby the compression of spring 45 may be varied.

Connecting rod 39 is provided with a threaded portion 47 which interacts with the interior thread of a sleeve 48, the latter having a hand wheel 49 by means of which it is subjected to angular movement. The sleeve 48 is similarly connected by a thread to a stud 50 which is pivoted at 51 to the slide rod 39'.

The cam 42 is keyed to a counter-shaft 52 adapted to be actuated by a motor or any suitable prime mover through the worm and gear drive 53 and 54 respectively. The worm gear 54 is provided with a bevel gear 55 that is rotatable therewith and the teeth of the bevel gear interact with the teeth of a bevel gear 56 that consitutes a planetary gear journaled for rotation on a worm gear segment 57 the teeth of which interact with a worm 58 which is manually operated by a hand wheel (not shown). Cam 41 is provided with a hub extension 59 terminating in a bevel gear 60 which cooperates with the teeth of the planetary gear 56 to render the cam 41 angularly movable to vary its position relative to cam 42, it being understood that cams 41 and 42 rotate in opposite directions by their connection with the differential gear mechanism.

Figure 5:
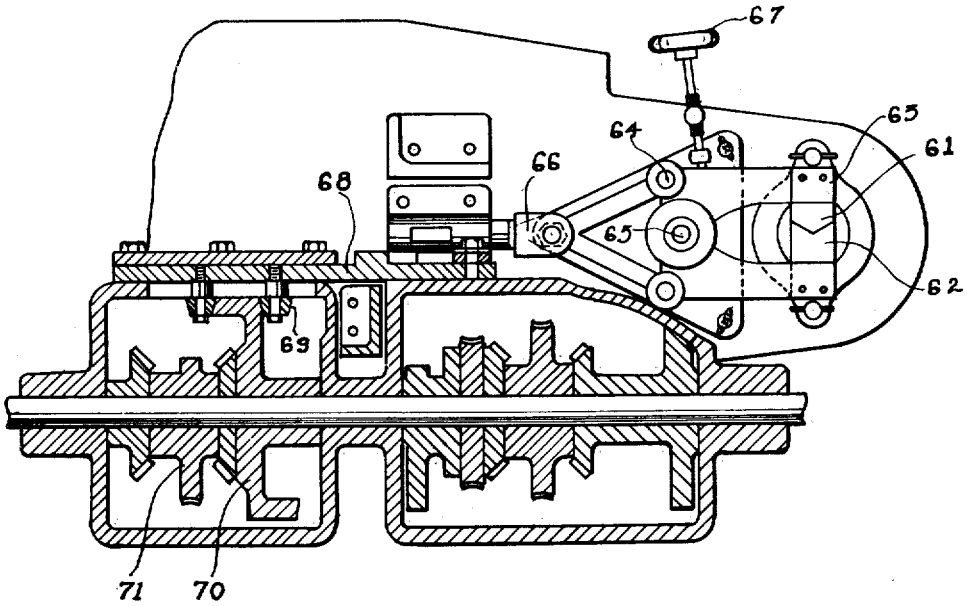
Figure 5 is a bottom plan view of the boot illustrating the cut-off or shear mechanism and showing the shear operating mechanism in section.

The shear and shear operating mechanism will now be described in connection with Figures 3 and 5 of the drawings: Referring to Figure 5, the shear comprises a pair of cutting blades 61 and 62 which are adapted to overlap and which are secured to the arms 63 of a toggle member pivoted at 64, the members 63 being also pivoted at 65 around which they are subjected to angular movement by the reciprocating movement of a rod 66. Adjustment of the shear blade may be made by the hand wheel 67 to set the blades to center the shear blades in line with the center of the discharge orifice. The rod 66 is actuated by a bar 68 which carries rollers 69 that engage a cam 70 journaled on the counter-shaft 52 and this cam is adjustable angularly with respect to cams 41 and 42 through the differential gear mechanism generally designated by the reference character 71 and which is controlled by a hand operated worm 72 shown in Figure 3.

Figure 2:
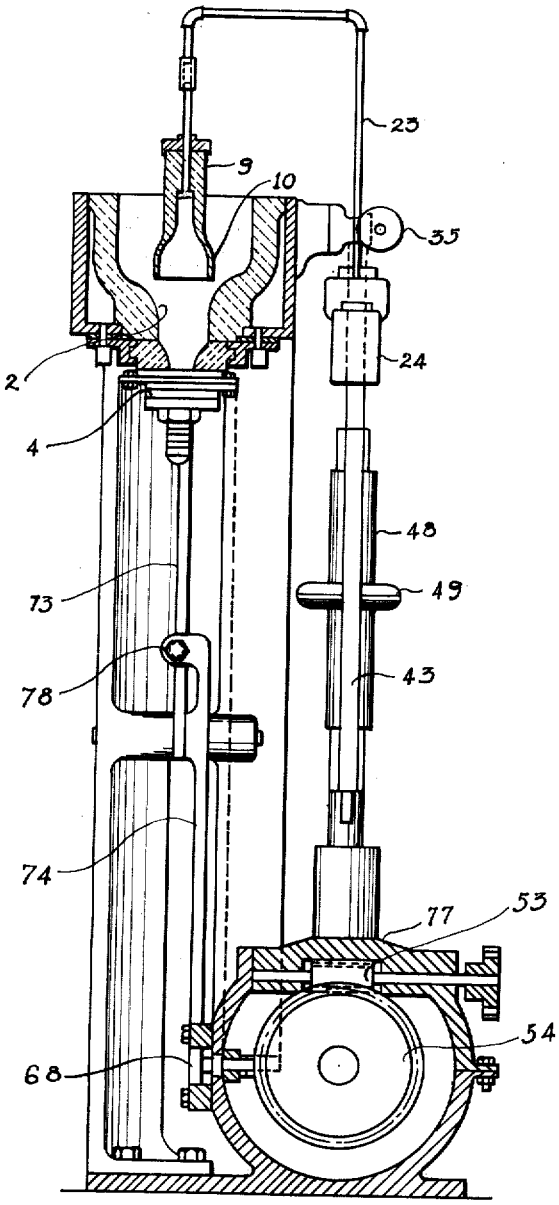
Figure 2 is a front elevational view partially in section of the feeder mechanism showing a part of the shear operating mechanism and adjustable control mechanism.
Figure 7:
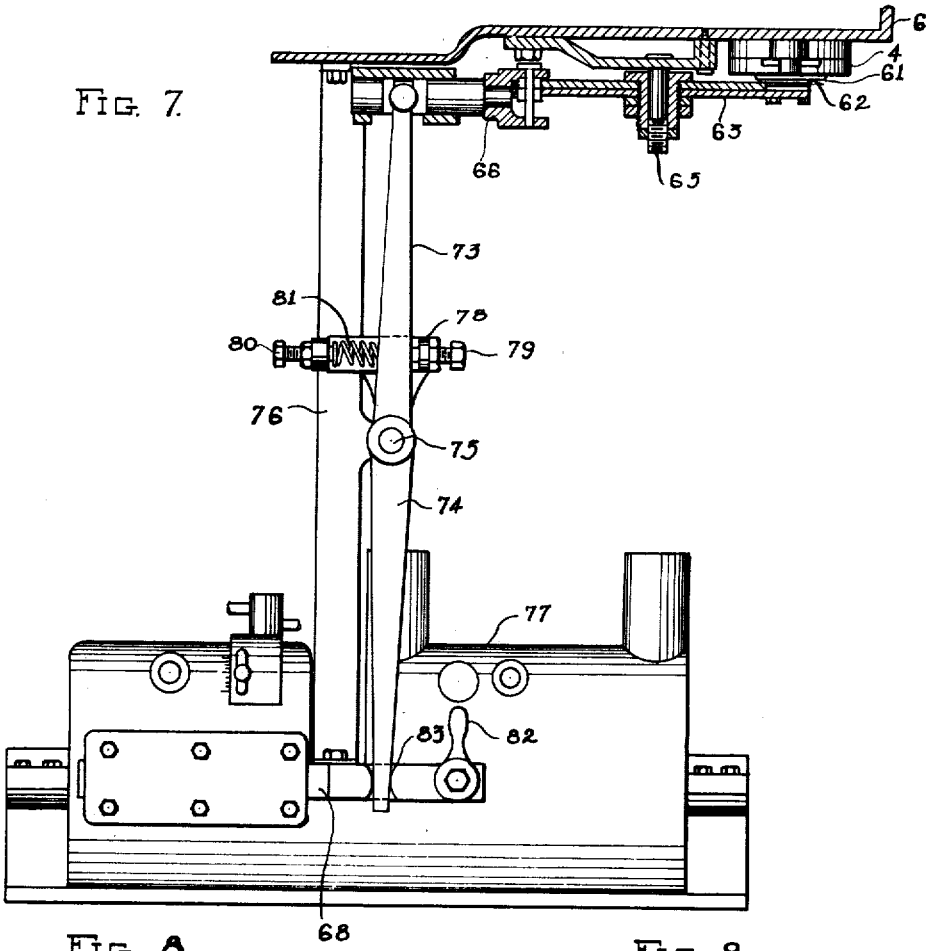
Figure 7 is a side elevational view of the shear and the shear operating mechanism.
Figure 8:
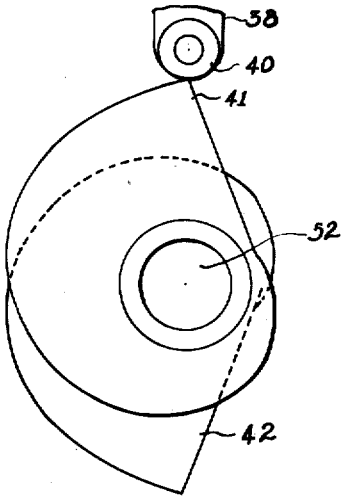
Figure 8 is an end elevational view of the cams of the control mechanism.
Figure 9:
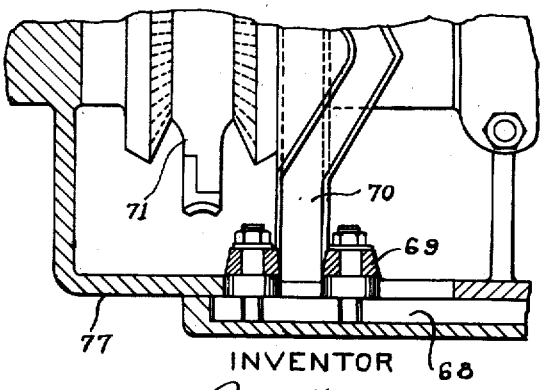
Figure 9 is a detail view of the shear operating cam mechanism and the connecting slide therefor; and, Figure 10 is a view in cross-section of the valve employed in the fluid cylinder of the impulse mechanism.

In Figure 7, the shear mechanism is shown in side elevation to illustrate the connection of the rod 66 with the slide bar 68 through levers 73 and 74 which are pivoted at 75 to an upright 76 of the casing 77 that houses the operating mechanism. The connection of levers 73 and 74 is more clearly illustrated in Figure 2 of the drawings in which the lever 74 is shown as provided with an off-set portion 78 having adjusting screws 79 and 80 and having a coil spring 81 disposed between one of the adjusting screws and the lever 73, (see Fig. 7), to provide for lost motion and adjustment, the purpose of the device 78 being to permit movement of the lever 74 in response to the actuating bar 68 without placing harmful stress on the shears in the event they would meet a hard obstacle in the glass. Further safety means are provided through the latch 82 which when tripped throws the abutment 83 out of alignment to permit free movement of lever 74 to move it out of contact with the actuating bar 68.

With reference to Figure 4 of the drawings, the plunger 27 is shown as partially immersed in a fluid 85 such as glycerine or oil, the fluid also filling an enlarged portion 86 at the upper end of the cylinder 26 to prevent air leakage between the relatively loose fitting plunger 27 and the cylinder 26. A vertical passage 87 is connected by port 88 with the enlarged end of cylinder 26 and communicates at its lower end with cross-passage 89 extending from cylinder 24 to the cylinder 26, and a ball valve 90 is provided to control the flow of fluid in passage 87, the ball being normally seated by a coil spring 91 which is adjusted by a screw 92.

Disposed within cylinder 24 is a float 93 having a valve 94 that controls the passage leading to conduit 23, the valve 94 functioning as a check valve to keep oil from being forced into the conduit 23. If, however, in operation, the oil or fluid 85 in the cylinder ever lifts the float 93 to its upper position any further displacement by the plunger 27 causes the liquid to flow through the vertical passage 87 into the enlargement 86 of cylinder 26 which acts as an overflow reservoir as well as a sealing means for plunger 27.

A modification of cylinder 24 is shown in Fig. 10 of the drawings in which a valve 95 is provided in the bottom of the cylinder. A valve sleeve 96 projects through the bottom wall of cylinder 24 and is provided with an orifice 97 which is enlarged at its ends 98 and 99. A ball 100 is retained by a cotter pin 101 and constitutes a valve which seats on the pressure stroke of plunger 27 and unseats on the suction stroke to draw air into the fluid chamber. An adjustable screw valve 102 controls the ingress of air through opening 103, the valve being adjustable to vary the volume of air passing into the fluid chamber, the air being subsequently displaced by the fluid through conduit 23.

The operation of the above described apparatus is briefly as follows: As previously stated, the bell 10 is submerged within the glass with the bottom of the valve in spaced relation with the walls of the well 2. In the absence of the application of positive pressure to the cavity of the bell, the glass will fill the bell cavity to the level of the glass pool, this being effected by the head pressure of the glass in the boot.

For the purpose of regulating the weight of the glass gobs discharged from the orifice ring 4, it is necessary to control the height of the glass from the orifice ring to a certain distance within the bell cavity and for this reason it is necessary to make provision for the maintenance of a given level of the glass in the bell cavity independent of the head pressure of the glass pool. This may be accomplished in several ways.

When the piston 27 is actuated by the oscillating bar 29, the fluid 85 will be displaced in cylinder 24 on the downstroke of the plunger 27 whereby part of the air is displaced bodily through the conduit 23 into the bell cavity. On the upstroke of plunger 27, the air will be displaced bodily through the conduit 23 from the bell into cylinder 24. The pulsations produced by the shifting body of air control the shape of gob delivered through the orifice. By varying the movement of the piston 27 through the medium of the adjustable control mechanism described, these pulsations can be made to produce any desired shape of gob. By adjusting the bell 10 through the screw mechanism 21, the distance between the lower edge of the bell and the wall of the well may be varied to control the size or weight of gob, and this control is, obviously, independent of the mechanism for controlling the shape of gob.

Under ordinary conditions of operation the area of the space between the lower end of the bell 10 and the wall 2 of the well should be slightly less than the area of the discharge orifice of the orifice ring 4. The flow of the glass from the main batch toward the discharge orifice may be varied by adjusting the weight of the bell with respect to the wall of the well to vary the area of the space therebetween relative to the area of the outlet orifice resulting in change of weight of the gob.

The orifice ring 4 is removable to permit rings of different sizes to be employed for feeding gobs having a wide range of weights.

In ordinary operation of the feeder, the valve 102 will not usually be employed. It will be apparent that the body of air in the air cylinder and the conduit 23 is sealed against leakage by the molten glass at one end and by the oil at the other. However, should any leakage occur, such leakage can be compensated for by opening the valve 102 just sufficient to permit enough air to be drawn into the cylinder on the suction stroke to compensate for that lost through leakage. It should be noted that the air is drawn into the cylinder through the valve only upon the suction stroke of the associated piston. Except for this operation, the valve 102 is not employed except in originally priming the air cylinder when the feeder is first started up.

The stroke and dwell of plunger 27 are regulable through the operating mechanism shown in Figure 3 of the drawings to control the shape of the gob as follows:

The stroke of piston 27 may be varied by adjusting the length of the connecting links of the oscillating arm 29 with the surface of cam 42, this adjustment being made by rotation of the screw sleeve 48 through manipulation of the hand wheel 49. Futher adjustment can be obtained by displacing the slide brackets 31 and 32 by means of the screws and hand wheels 34 and 35.

The cam 42 governs the down stroke of piston 27 which is the movement that imparts the impulse to the glass within the bell cavity and cam 41 raises the plunger or piston this being the impulse that permits the glass to flow into the bell cavity. The dwell essential to the glass flow from the orifice to produce a gob of proper shape is regulated through the differential gear mechanism by manipulation of the worm 58 whereby cam 41 is angularly displaced relative to cam 42 to control the period at which the upstroke of the plunger begins.

Spring 45 functions to impart a sudden impulse to the plunger at the beginning of the upstroke which produces a constriction or neck in the glass gob at the place where the shears engage and sever the same. Spring 45 also functions as a cushioning means between the linkage of the oscillating bar 29.

The shear mechanism is operative through the cam 70 which is rotated by the countershaft 52 and the operation of the shears may be synchronized with the impulse mechanism through the differential gear mechanism 71 to obtain a positive angular displacement of the respective cams, such adjustment being commonly termed phase changing which, however, in the present mechanism is effected through both the adjustment of the feeding impulses and the shearing mechanism each of which having independent regulation with respect to the other.

The adjusting mechanism for the stroke of the plunger 27 and the shear mechanism is positive and reliable and on this account the movable elements such as plungers 38 and 39 and brackets 31 may be adjusted according to calibrations provided thereon as shown in Figure 3 of the drawings so that once a particular setting has been obtained for producing a given shape and weight of gob, the setting can be reproduced at will by proper manipulation of the adjusting means.

In Figure 3 is shown a valve box A which is provided with conduits B and C which are connected to a source of fluid pressure and to the timer of the ware forming machine. A slide valve D controls the pressure to the timer mechanism and this valve is operated by cam 10 to control the mold movements in relation to the operation of the feeder and shears.

By sealing the plunger 27 with the fluid 85 as hereinbefore explained, leakage of air is entirely eliminated and the plunger will deliver a uniform impulse on both the suction and pressure stroke to maintain uniformity of the segregated mold charges or gobs.

Also, by employing the seal above the plunger, an unusual large clearance may be maintained between the plunger 27 and the wall of cylinder 26 thereby eliminating all friction in the impulse mechanism.

This would not be so important when the weight of the gob is controlled through the utilization of valve 102, but when the weight control is effected with the type of impulse mechanism illustrated in Figure 4 of the drawings wherein the head pressure of the glass above the orifice ring is dependent upon the relative areas of the orifice opening, and the space between the bell and walls of the well, the sealing of the impulse mechanism is absolutely essential as any leakage would produce variation in the weight of the gob.

It is evident from the foregoing description of the glass feeding mechanism herein disclosed that a large range of sizes of the gob produced thereby may be effectively obtained by a few simple adjustments which require no particular skill on the part of the operator and which can be readily effected without interrupting the operation of the feeder.

Also, by means of the different adjusting mechanism and its connected linkage the speed of the plunger, the dwells, and the length of stroke can be readily varied to effect the desired shape of the gob without interrupting the operating mechanism and by employing the mechanical operating means and adjustment herein described, the control is positive, and once the operating mechanism has been set to produce a gob of desired shape and weight, it can be constantly maintained for any desired period so long as the thermal and physical characteristics of the glass delivered to the boot remains constant.

I claim as my invention:

1. Apparatus for segregating mold charges of regulable weight and shape from a mass of molten glass comprising a feeder boot having a well in the extended end thereof terminating in a discharge orifice, a feeding bell in alignment with said orifice, impulse producing mechanism communicating with said bell for producing impulses of the glass within said well and bell, said mechanism comprising a cylinder, a body of neutral liquid therein, a conduit connecting said cylinder with said bell for confining a column of air between said liquid and the glass in said bell, a plunger acting upon the neutral liquid in said cylinder to produce impulses which are transmitted by said column of air to the glass in said feeding bell, and adjustable means for producing and maintaining a given volume of air in the cavity of said bell whereby the volume of the glass admitted to the bell cavity is positively controlled.

2. Apparatus for segregating mold charges of regulable weight and shape from a mass of glass comprising a well having a discharge orifice at the bottom thereof, a feeding bell in vertical alignment with said discharge orifice, an impulse mechanism having a conduit connection with the top of the feeding bell, said impulse mechanism comprising a plurality of communicating fluid cylinders having a body of neutral fluid therein and having a plunger disposed in one of said cylinders, said impulse mechanism having the conduit leading to the feeding bell connected to the other of said cylinders for confining an air column between the neutral fluid and the glass in the bell, and means for maintaining a liquid seal around said plunger.

3. Apparatus for segregating mold charges of regulable weight and shape from a mass of molten glass comprising a well for receiving molten glass from a continuous supply source, said well having a discharge orifice at the bottom thereof, a feeding bell in vertical alignment with said orifice, the mouth of the bell being submerged below the level of the glass, an impulse mechanism having conduit connections with the top of the feeding bell, means for adjusting the height of the bell relative to the wall of the well, said impulse mechanism comprising a plurality of communicating cylinders containing a neutral liquid, one of said cylinders being connected with the feeding bell through said conduit, and the other of said cylinders having a plunger disposed for reciprocating movement therein, means for bypassing part of the liquid from the first of said cylinders to the top portion of the second cylinder to produce a liquid seal, and means for bleeding air into the liquid in said first cylinder on the suction stroke of said plunger whereby to build up the desired body of air in the feeding bell.

4. Apparatus for segregating mold charges of regulable weight and shape from a mass of molten glass comprising a feeder boot having a well for receiving glass and having a discharge orifice at the bottom thereof, a feeding bell in vertical alignment with said well, impulse mechanism having a conduit connection with the top of the feeding bell, said impulse mechanism comprising a plurality of communicating cylinders containing a neutral liquid one of which is connected by said conduit to the feeding bell, and the other of which is provided with a reciprocating plunger, the plunger cylinder being provided with an enlargement at the top thereof which communicates through a passage with a passage connecting said cylinders to constitute an overflow chamber for the liquid in one of said cylinders, and the other of said cylinders being provided with a valve at the bottom thereof, the valve being sealed against the escape of fluid from these cylinders, and being adapted to bleed in a regulable quantity of air into the liquid on the suction stroke of the plunger when desired.

5. The combination in a machine for feeding mold charges of molten glass comprising a container for molten glass having a discharge orifice, a body of air contacting with a portion only of the glass in said container, means for bodily displacing the air toward and from said orifice to shape the glass delivered therefrom, and liquid sealing means for maintaining the quantity of air in said body substantially constant.

6. The combination in a machine for feeding mold charges of molten glass comprising a container for molten glass having a discharge orifice, a feeding bell having its mouth submerged in the glass adjacent said orifice, an air cylinder, a piston associated with said cylinder, and a connection of relatively small diameter between said cylinder and said bell, and a liquid seal for the air in said cylinder.

7. In a glass feeder, the combination with a container for molten glass having a submerged discharge outlet and a hollow refractory member depending into the glass in substantially axial alignment with the outlet, of an air compressing and rarefying mechanism operatively connected with the interior of said hollow refractory member for periodically applying each of a plurality of different pneumatic impulses to the glass over the outlet, said air compressing and rarefying mechanism including a vertically reciprocable member operable to cause said impulses on the glass, means for reciprocating said reciprocable member, a lever adjacent to said air compressing and rarefying mechanism, connections between the lever and said reciprocable member of such character that oscillation of the lever will reciprocate said member, cam-actuated means for swinging the lever in one direction to move the reciprocable member upward, other cam-actuated means for swinging the lever in the opposite direction to move the reciprocable member downward, one of said cam-actuated means including a lost motion device.

8. In a glass feeder, the combination with a container for molten glass having a submerged discharge outlet and a hollow refractory member depending into the glass in substantially axial alignment with the outlet, of an air compressing and rarefying mechanism operatively connected with the interior of said hollow refractory member for periodically applying each of a plurality of different pneumatic impulses to the glass over the outlet, said air compressing and rarefying mechanism including a vertically reciprocable member operable to cause said impulses on the glass, means for reciprocating said reciprocable member, a lever adjacent to said air compressing and rarefying mechanism, connections between the lever and said reciprocable member of such character that oscillation of the lever will reciprocate said member, cam-actuated means for swinging the lever in one direction to move the reciprocable member upward, other cam-actuated means for swinging the lever in the opposite direction to move the reciprocable member downward, one of said cam actuated means including a lost motion device and a spring interposed between relatively movable parts of said lost motion device, the other of said cam-actuated means being adjustable to vary the operation of said reciprocable member in response to the operation of said cam-actuated means.

9. In a glass feeder, the combination with a container for molten glass, said container having a submerged discharge outlet and a hollow refractory implement depending into the glass in the container in substantially axial alignment with the outlet, of an air compressing and rarefying device operatively connected to the interior of said hollow implement, said air compressing and rarefying device including a reciprocable member operable to cause periodic discharge accelerating pneumatic impulses and periodic discharge retarding impulses upon the glass above the outlet, a lever adjacent to said air compressing and rarefying device, connections between said lever and said reciprocable implement of such character that oscillation of the lever will reciprocate the implement, a rotating cam, a connecting rod mechanism pivotally connected at one end with said lever and operable by said cam to swing the lever in one direction, a second rotating cam and a second connecting rod mechanism pivotally connected at one end to said lever and operable by the second cam to swing the lever in the opposite direction, and means for effecting a phase change between the cycle of rotation of one of said cams with respect to the cycle of rotation of the other cam.

10. In a glass feeder, the combination with a container for molten glass, said container having a submerged discharge outlet, and a hollow refractory implement depending into the glass in the container in substantially axial alignment with the outlet of an air compressing and rarefying device operatively connected to the interior of said hollow implement, said air compressing and rarefying device including a reciprocable member operable to cause periodic discharge accelerating pneumatic impulses and periodic discharge retarding impulses upon the glass above the outlet, a lever adjacent to said air compressing and rarefying device, connections between said lever and said reciprocable implement of such character that oscillation of the lever will reciprocate the implement, a rotating cam, a connecting rod mechanism pivotally connected at one end with said lever and operable by said cam to swing the lever in one direction, a second rotating cam and second connecting rod mechanism pivotally connected at one end to said lever and operable by the second cam to swing the lever in the opposite direction, and means for independently adjusting the points of pivotal connection between said connecting rod mechanisms and said lever.

11. In glass feeding mechanism, the combination with a container for molten glass, said container having a submerged discharge outlet, and a hollow refractory implement depending into the glass in the container in substantially axial alignment with the outlet, of a chamber adjacent to said glass container, said chamber having an outlet at its top and an inlet adjacent to its bottom and having substantially leakproof walls, a second chamber having a connection adjacent to its lower end with the inlet of said first chamber, a body of liquid partially filling said chambers and extending in each above the level of the inlet of the first chamber, a conduit connected with the outlet in said first chamber and with said hollow refractory implement to maintain a confined body of air between the liquid in the first chamber and the glass at the lower end of the interior of said hollow implement, and means for moving said body of liquid in said communicating chambers periodically to compress and periodically to rarefy the body of air between said body of liquid and the glass above the outlet.

12. In glass feeding mechanism, the combination with a container for molten glass having a submerged discharge outlet and a hollow refractory implement depending into the glass in the container in substantially axial alignment with the outlet, of an air compressing and rarefying device comprising a cylinder, a liquid and a piston reciprocating therein, and means operatively connecting said cylinder with said hollow refractory implement to maintain a confined body of air between said liquid and the glass at the lower end of said hollow implement and means for reciprocating said piston so that said body of air will be periodically compressed and periodically rarefied.

13. Apparatus for segregating mold charges of regulable weight and shape from a mass of molten glass comprising a flow channel having an outlet orifice, a feeding bell in vertical alignment with said orifice, an impulse mechanism having a conduit connection with said bell and including a member reciprocable to cause both periodic superatmospheric impulses and periodic sub-atmospheric impulses on the glass in the feeding bell, mechanism for operating said reciprocable member comprising a cam operated bar, means for adjustably regulating the movement of the said bar to vary the length of stroke of said reciprocable member and means for regulably controlling the operation of said bar to vary the duration of a dwell of the reciprocable member independently of a change of speed of the reciprocatory movements of said member.

14. Glass feeding mechanism comprising a container for molten glass having a submerged outlet, means for directing periodic pneumatic pressure and vacuum impulses to the glass above the outlet and an air compressing and rarefying device comprising a container for liquid connected to said directing means above the level of the liquid, a liquid in said container, and means for periodically raising the level of the liquid to create pressure impulses on the glass above the outlet and to lower the level of the liquid to create a partial vacuum above the glass over the outlet.

15. Glass feeding apparatus, comprising a container for molten glass, said container having a discharge outlet submerged by the glass therein, a hollow refractory implement depending into the glass in the container in substantially axial alignment with the discharge outlet, an impulse mechanism having a liquid chamber, a liquid therein, a conduit connecting said hollow refractory implement with said liquid chamber at a level above the liquid in said chamber for confining a column of air between said liquid and the glass at the lower end of said hollow refractory implement, and mechanism for effecting reciprocatory movements of liquid in said liquid chamber for alternately compressing and rarefying said column of air so as periodically to exert extrusive impulses and retractive impulses on the glass at said discharge outlet.

16. In a glass feeder, an air pump having a piston, a lever for reciprocating the piston, a cam adapted to move the lever for the compression stroke of the piston, separate means for moving the piston for the suction stroke, and means to control the amplitude of movement of the piston on the suction stroke.

17. In a glass feeder, an air pump having a piston, a lever connected to the piston, a rotating cam adapted to contact and move the lever, separate means for returning the lever on a reverse stroke, and means variable at will for controlling the amplitude of such reverse stroke.

18. In a glass feeder, an air pump having a piston, a lever for reciprocating the piston, a shaft, mechanical connections between the shaft and the lever whereby rotation of the shaft will move the lever for the compression stroke of the piston, separate means for moving the piston for the suction stroke, and means independent of the shaft for regulating the speed of the piston on the suction stroke.

19. In a glass feeder, an air pump having a piston, a lever for reciprocating the piston, a driving shaft, a rotating cam on the shaft adapted to move the lever for the compression stroke of the piston, separate means for moving the piston for the suction stroke, and means independent of the shaft for regulating the speed of the piston for the suction sroke.

PETER KUCERA.

CERTIFICATE OF CORRECTION.

Reissue No. 21,037. March 28, 1939.

PETER KUCERA.

It is hereby certified that error appears in the printed specification of the above numbered patent requiring correction as follows: Page 3, first column, line 73, for the word "weight" read height; and that the said Letters Patent should be read with this correction therein that the same may conform to the record of the case in the Patent Office.

Signed and sealed this 23rd day of May, A. D. 1939.

Henry Van Arsdale (Seal) Acting Commissioner of Patents.